United States Patent Office 3,117,853
Patented Jan. 14, 1964

3,117,853
COMPOSITION FOR INHIBITING SEED AND FUNGAL SPORE GERMINATION
Chester R. Benjamin, Hyattsville, Md., and William F. Hendershot and Clifford W. Hesseltine, Peoria, Ill., assignors to the United States of America as represented by the Secretary of Agriculture
No Drawing. Original application Sept. 18, 1961, Ser. No. 139,004, now Patent No. 3,063,909, dated Nov. 13, 1962. Divided and this application May 17, 1962, Ser. No. 202,343
1 Claim. (Cl. 71—2.5)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This application is a division of Serial No. 139,004, filed September 18, 1961, now Patent No. 3,063,909.

This invention relates to a novel seed and fungal spore germination inhibitor obtained in crystalline form from certain fermentations of a nonsporulating strain of microorganisms, namely Pestalotia ramulosa v. Beyma, NRRL 2826.

More particularly this invention relates to the discovery that under low temperature conditions of culture or fermentation Pestalotia ramulosa, NRRL 2826, reproduces without forming spores and that at an optional temperature of only 15° C. the mycelium of this strain forms large amounts of a novel crystalline compound, solutions, or dispersions of which, we discovered, are able to selectively inhibit the germination of grass and plant seeds and the spores of a variety of fungi. The crystalline compound produced in the specific cultures and fermentations of Pestalotia ramulosa NRRL 2826 under the atypical and highly critical fermentation conditions described below has been determined to have the empirical formula $C_{10}H_{14}O_3$ that may be chemically designated as the lactone of 2-oxo-6-(2-hydroxypropyl)-cyclohexanecarboxylic acid. In recognition of its source, we call the above novel compound ramulosin.

Three varieties or strains of Pestalotia ramulosa are known, namely Pestalotia (Truncatella) ramulosa v. Beyma, NRRL 2826, P. ramulosa NRRL 1228, and P. ramulosa NRRL A–9471. The germinative forms of the three varieties are indistinguishable from one another even under the microscope, but carbon and nitrogen utilization studies employing extensive spectra of carbohydrates as shown in Table I and amino acids as shown in Table II indicate distinguishing differences in utilization and, most importantly, marked differences as to the presence or absence of the ability to sporulate. Under the conditions of the above studies P. ramulosa NRRL 2826 did not sporulate with any of the carbon and nitrogen sources; P. ramulosa NRRL 1228 formed spores with 8 of the 16 carbon sources and with all nine of the nitrogen sources; P. ramulosa NRRL A–9471 formed spores with 14 of the 16 carbon sources as well as in the absence of a carbon source, and formed spores in the presence of 8 of the 9 nitrogen sources as well as in the absence of a nitrogen source.

In furtherance of our discovery of some macroscopic colorless to white crystals of ramulosin in a malt extract agar culture of P. ramulosa NRRL 2826, the following objects of our invention have developed. A principal object is the discovery of a novel compound of fungal origin. Another object is the discovery of culture and fermentation conditions that provide high yields of the hitherto unknown compound. A still further object is the discovery of a microbiological product having distinctly inhibitory effects on fungi and anti-germination activity on plant seeds including grass, and vegetable seeds. The above and other objects of our invention will become clear in the course of the following specification.

In accordance with the present invention we have now discovered that the mycelium of Pestalotia ramulosa v. Beyma NRRL 2826, an imperfect fungus belonging to the Order Melanconiales, produces maximum yields of ramulosin in fermentations or cultures maintained at 15° C., moderate yields at up to 25° C., only traces at 28° C. and no yield of ramulosin above 28° C.

We have discovered that Pestalotia ramulosa NRRL 2826 never forms spores but produces ramulosin, whereas scarcely distinguishable P. ramulosa NRRL 1228 and P. ramulosa NRRL A–9471 do sporulate under certain ordinary conditions but produce no ramulosin. From these minimal observations we theorized that perhaps the ramulosin (which is produced only in the consistently nonsporulating strain) may be responsible for and associated with the absence of sporulation in P. ramulosa NRRL 2826 and, by extension, we considered whether ramulosin might not also inhibit the germination of other plant and vegetable life. We have now verified the above hypothesis.

Our first discovery of ramulosin crystals, as already indicated, was noted in a profuse mycelial growth on a malt extract agar plate. This mode of propagation is, of course, wholly unsuitable for any large-scale production. We subsequently found that the best fermentation medium for producing ramulosin comprises 4.0 percent malt extract, 4.0 percent dextrose, and 0.1 percent peptone, and that ramulosin is produced both in submerged and in surface fermentations conducted at 15° (optimal) to 25° C. during the 5–9 weeks succeeding an unproductive initial period of 2–4 weeks in which the growing mycelium must apparently first substantially exhaust the carbon source present in the fermentation medium and perhaps also adapt to some inhibitory metabolite or to an intermediate which might then be further changed into the actual insoluble crystals of ramulosin.

At the end of the fermentation, pure ramulosin was obtained by extracting the filterable solids two times with 2 volumes of acetone and then twice with ether, recovering each extract by filtration, adding thereto the 12 hour ether extract of a tenfold vacuum concentrate of the culture filtrate, evaporating to dryness to obtain a crude product, successively recrystalizing the ramulosin from aqueous acetone, then from hexane, and again from aqueous acetone, filtering, and air-drying to obtain crystalline ramulosin melting at 121.0±0.5° C. Ramulosin has a rotation of $[\alpha]_{25}{}^D$ +17.6° (C., 2.9; ethanol). Under UV it shows a single peak at 264 m$\mu$ ($\epsilon$=10,100). It shows strong IR bands respectively at 6.05, 8.05, and 11.2$\mu$. The benzoate ($C_{17}H_{18}O_4$) melted at 80–81° C. The 4-dimethylamino-3,5-dinitrobenzoate ($C_{19}H_{21}O_8N_3$) melted at 179–181° C. The p-phenylazobenzoate ($C_{23}H_{22}O_4N_2$) melted at 133–134° C.

In standard seed germination tests ("Rules and Regulations Under the Federal Seed Act," USDA, 1956, p. 29)

ramulosin was solubilized at concentrations of 1, 10, 100, 1000 p.p.m. in boiling water containing 1 percent of a commercially available surface active polyoxyethylene derivative of fatty acid partial esters of hexitol anhydride although any other surface active dispersing agent would do. Seeds were soaked in the cooled solution for one hour before incubating in Petri dishes. Tomato and grass seeds were incubated at room temperature and exposed to the natural diurnal cycle. The other seeds were incubated in the dark at 28° C. The results are shown in Table III.

Ramulosin was also tested for its effect on various fungi. At 1000 p.p.m. it retarded but did not prevent the mycelial growth of a spore-forming strain of *P. ramulosa*. At 250 p.p.m. it prevented germination of synthetic mucor agar (Hesseltine, Mycologia 46, 358, 1954), of conidiospores of *Aspergillus niger* NRRL 3 and of *Fusarium moniliforme* NRRL 2374. It also inhibited the germination of ascospores of *Chaetomium globosum* NRRL 1870 and of sporangiospores of *Rhizopus stolonifer* NRRL 2233 and of *Mucor rouxii* NRRL 1894. At 1000 p.p.m. ramulosin inhibited proliferation of the basidiomycete, *Ustilago maydis* NRRL 2321. These results are summarized in Table IV.

The following specific examples show that ramulosin is produced both in surface and in submerged fermentations. Although for convenience we usually employed malt extract, glucose, and peptone as the carbon and nitrogen sources, D-glutamic acid is the best source of nitrogen, and the data of Tables I and II suggest other sources that might be substituted.

Also, since the production of ramulosin does not begin until there has been an extensive proliferation of mycelia, commercially it would be advantages to speed the growth of the mycelia by initially fermenting at 25°–28° C., until the carbon source is virtually exhausted, and then lowering the temperature to about 15° C. to induce the maximum production of ramulosin by the mycelia.

EXAMPLE 1 (SURFACE FERMENTATION)

A 1 sq. cm. block of malt-extract agar medium which had been inoculated by a loop transfer of stock from a culture of *P. ramulosa* NRRL 2826 and incubated at 25° C. for 4–7 days was transferred to 300 ml. of malt-extract broth in a 2800 ml. Fernbach flask and fermented as a still culture held at 15° C. for 90 days. The malt-extract broth fermentation medium consisted of 40 g. of malt extract, 1 g. of peptone, and 40 g. of D-glucose in 1000 ml. distilled water. The original pH was 5.4 and the final pH was 4.3. Ramulosin crystals were first seen at 26 days. At 66 days the dry weight of mycelia was 2.08 g. per 1000 ml. of fermentation medium and the yield of ramulosin was 1.45 gm. At 68 days the yield of crystalline ramulosin was 1.50 gm. per 1000 ml. compared with 1.24 gm. from a parallel fermentation at 20° C. and of only 0.98 gm. per 1000 ml. from a fermentation at 25° C. A 90 day fermentation at 15° C. yielded 6.2 gm. per liter of ramulosin, equivalent to 15.8 percent of the glucose added. A fermentation at 28° C. produced only a trace of mycelial growth and no ramulosin.

EXAMPLE 2 (SURFACE FERMENTATION)

Fermentations similar to those of Example 1 were carried out at 15° C. in a less concentrated medium containing malt extract 20 g., peptone 1 g., and D-glucose 20 g. per 1000 ml. of distilled water. The fermentation was harvested at 90 days and 2.8 gm. of crystalline ramulosin per 1000 ml. of fermentation medium was obtained.

EXAMPLE 3 (SUBMERGED SHAKEN FERMENTATION)

A fermentation similar to that of Example 1 was incubated on a rotary shaker at 15° C. for 74 days. Although the mycelium apparently agglutinated and rolled into a large clump (5.0 gm. per 1000 ml.) which inter- fered with its oxidative metabolism, a suboptimal yield of 3.0 gm. of ramulosin per 1000 ml. of medium (equivalent to 7.5 percent of the glucose added to the fermentation) was obtained.

EXAMPLE 4 (SUBMERGED STILL FERMENTATION)

A pilot plant scale fermentation of 200 gal. of malt-extract broth (4 percent glucose, 4 percent malt extract and 0.1 percent peptone) was inoculated with 20 gal. of the culture grown on a similar medium for 7 days at 25° C. The fermentation was run at 18° C. for 28 days and yielded a total of 1125 gms. of pure ramulosin or 5.1 gm. per liter.

TABLE I.—*Utilization of Carbon Compounds by Strains of* Pestalotia Ramulosa

| | Utilization | | | Sporulation | | |
|---|---|---|---|---|---|---|
| | NRRL 2826 | NRRL 1228 | NRRL A-9471 | NRRL 2826 | NRRL 1228 | NRRL A-9471 |
| C-Free | − | − | − | − | − | + |
| i-Erythritol | − | − | sl | − | − | − |
| Glycerol | + | sl | sl | − | − | + |
| d-Xylose | + | − | + | − | − | + |
| l-Arabinose | + | + | + | − | + | + |
| d-Ribose | − | − | − | − | − | + |
| Dextrose | + | + | + | − | − | + |
| Galactose | + | + | + | − | + | + |
| l-Sorbose | − | − | − | − | − | − |
| Trehalose | sl | − | sl | − | − | + |
| Melibiose | sl | + | sl | − | + | + |
| Lactose | sl | sl | + | − | − | + |
| Sucrose | + | + | + | − | + | + |
| Cellibiose | + | + | + | − | + | + |
| Maltose | + | + | + | − | + | + |
| Raffinose | + | + | + | − | + | + |
| Sol. Starch | + | + | + | − | + | + |

TABLE II.—*Utilization of Nitrogen Compounds by Strains of* Pestalotia Ramulosa

| | Utilization | | | Sporulation | | |
|---|---|---|---|---|---|---|
| | NRRL 2826 | NRRL 1228 | NRRL A-9471 | NRRL 2826 | NRRL 1228 | NRRL A-9471 |
| N-Free | − | − | − | − | − | + |
| d-Glutamic acid | +++ | +++ | +++ | − | + | + |
| Glycine | +++ | +++ | +++ | − | + | + |
| $NaNO_2$ | ++ | ++ | ++ | − | + | + |
| l-Arginine | +++ | +++ | ++ | − | + | + |
| $(NH_4)_2SO_4$ | + | + | + | − | + | + |
| Asparagine | ++++ | ++++ | ++++ | − | + | + |
| $KNO_3$ | +++ | +++ | +++ | − | + | + |
| Urea | ++ | +++ | +++ | − | + | + |
| l-Proline | ++++ | ++++ | ++++ | − | + | + |

TABLE III.—*Effect of Ramulosin on Seed Germination* [a]

| | | Percent of seeds germinated | | | | | |
|---|---|---|---|---|---|---|---|
| Seed | Incubation time, days | Controls | | p.p.m. of ramulosin | | | |
| | | Water | Tween-80 | 1,000 | 100 | 10 | 1 |
| Beans: | | | | | | | |
| Pinto | 4 | 90 | 50 | 65 | 50 | 50 | 70 |
| Soy | 4 | 100 | 95 | 60 | 80 | 85 | 85 |
| Corn | 4 | 95 | 75 | 15 | 90 | 90 | 90 |
| Grass: | | | | | | | |
| Clover | 6 | 90 | 90 | 10 | 90 | 90 | 90 |
| Mixed (rye, blue, clover) | 6 | 60 | 60 | 0 | 30 | 50 | 60 |
| Morning glory | 4 | 90 | 95 | 10 | 90 | 90 | 90 |
| Oats | 4 | 95 | 70 | 0 | [b] 15 | 35 | 75 |
| Sorghum | 4 | 90 | 90 | [b] 20 | 65 | 85 | 70 |
| Tomato | 8 | 95 | 90 | 0 | [b] 30 | 70 | 90 |
| Wheat | 4 | 75 | 70 | 0 | [b] 20 | 25 | 70 |

[a] Standard procedures were followed.
[b] These seedlings were stunted as compared with the control seedlings.

TABLE IV.—*Effect of Ramulosin on Germination of Selected Fungal Spores*

| Culture | Spore type | Incubation time,[1] hrs. | Ramulosin (p.p.m.) | | | |
|---|---|---|---|---|---|---|
| | | | 0 | 50 | 250 | 500 |
| | | | Percent inhibition [2] | | | |
| *Aspergillus niger* NRRL 3 | Conidiospores | 24 | 0 | 0 | 0 | 100 |
| | | 48 | 0 | 0 | 0 | (20) |
| *Fusarium moniliforme* NRRL 2374 | do | 24 | 0 | 0 | (16) | 100 |
| | | 48 | 0 | 0 | 0 | (20) |
| *Chaetomium globosum* [3] NRRL 1870 | Ascospores | 24 | 0 | | | |
| | | 48 | 0 | 65 | 65 | 100 |
| *Rhizopus stolonifer* NRRL 2233 | Sporangiospores | 24 | 0 | 0 | 0 | 100 |
| | | 48 | 0 | 0 | 0 | 71 |
| *Mucor rouxii* NRRL 1894 | do | 24 | 0 | 0 | 0 | 100 |
| | | 48 | 0 | 0 | 0 | (10) |

[1] Incubation time is the number of hours after treatment with ramulosin.
[2] Controls with the equivalent amount of alcohol as in the tests were run. Numbers in ( ) indicate retarded growth.
[3] This culture germinates slowly and no counts were made at 24 hours.

Having fully disclosed our invention, we claim:

A seed and fungal spore germinaiton inhibitor composition comprising at least about 10 ppm. of the lactone of 2-oxo-6-(2-hydroxypropyl)-cyclohexanecarboxylic acid in an aqueous vehicle also containing about 1 percent of a surface active agent.

References Cited in the file of this patent

UNITED STATES PATENTS 2,929,821   Hoeksema et al. _____ Mar. 22, 1960

OTHER REFERENCES

Benjamin et al.: Nature, 188, 662–663, Nov. 19, 1960.